(12) United States Patent
Lim et al.

(10) Patent No.: US 9,973,307 B2
(45) Date of Patent: May 15, 2018

(54) APPARATUS AND METHOD FOR TRANSMITTING FEEDBACK INFORMATION IN WIRELESS COMMUNICATION SYSTEMS

(71) Applicant: Samsung Electronics Co., Ltd., Suwon-si, Gyeonggi-do (KR)

(72) Inventors: Jun-Sung Lim, Seoul (KR); Hun-Kee Kim, Seoul (KR); Sung-Man Han, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 86 days.

(21) Appl. No.: 14/381,439

(22) PCT Filed: Feb. 13, 2013

(86) PCT No.: PCT/KR2013/001107
§ 371 (c)(1),
(2) Date: Aug. 27, 2014

(87) PCT Pub. No.: WO2013/129789
PCT Pub. Date: Sep. 6, 2013

(65) Prior Publication Data
US 2015/0124719 A1    May 7, 2015

(30) Foreign Application Priority Data
Feb. 28, 2012  (KR) .................. 10-2012-0020350

(51) Int. Cl.
*H04L 1/18*    (2006.01)
*H04W 72/04*   (2009.01)

(52) U.S. Cl.
CPC .......... *H04L 1/1896* (2013.01); *H04L 1/1812* (2013.01); *H04L 1/1854* (2013.01); *H04W 72/0413* (2013.01)

(58) Field of Classification Search
CPC .................................................. H04L 1/1896
(Continued)

(56) References Cited

U.S. PATENT DOCUMENTS 5,467,341 A * 11/1995 Matsukane ........... H04L 1/1887
                                                370/253
6,621,796 B1 * 9/2003 Miklos ................. H04L 1/1621
                                                370/236
(Continued)

FOREIGN PATENT DOCUMENTS

CN    1914846 A    2/2007
CN    101237313 A  8/2008
(Continued)

*Primary Examiner* — Andrew Lai
*Assistant Examiner* — Andrew C Lee
(74) *Attorney, Agent, or Firm* — Jefferson IP Law, LLP

(57) ABSTRACT

An apparatus and a method for transmitting HARQ feedback information in a wireless communication system are provided. In so doing, the method for transmitting the HARQ feedback information in a receiving end includes confirming the number of packets received from a transmitting end, and when receiving a reference number of packets from the transmitting end, transmitting to the transmitting end a feedback signal comprising HARQ feedback information for the reference number of the packets.

26 Claims, 13 Drawing Sheets

US 9,973,307 B2

Page 2

(58) Field of Classification Search
USPC .................. 370/315–347, 441, 252
See application file for complete search history.

(56) References Cited

U.S. PATENT DOCUMENTS

| | | | | |
|---|---|---|---|---|
| 7,095,719 | B1* | 8/2006 | Wilhelmsson | H04L 1/0002 370/252 |
| 7,095,729 | B2* | 8/2006 | Sachs | H04L 1/0057 370/341 |
| 7,865,147 | B2* | 1/2011 | Olgaard | H04B 17/0085 455/115.2 |
| 7,885,264 | B2* | 2/2011 | Tateno | H04L 1/1614 370/230 |
| 8,254,297 | B2* | 8/2012 | Iwagami | H04W 52/325 370/311 |
| 8,321,740 | B2 | 11/2012 | Kuo | |
| 8,392,784 | B2 | 3/2013 | Kuo | |
| 8,737,374 | B2* | 5/2014 | Sambhwani | H04L 1/16 370/335 |
| 9,136,983 | B2* | 9/2015 | Watson | H04L 1/0041 |
| 2002/0004924 | A1* | 1/2002 | Kim | H04L 1/0068 714/752 |
| 2002/0049068 | A1* | 4/2002 | Koo | H04L 1/1671 455/522 |
| 2002/0071407 | A1* | 6/2002 | Koo | H04B 7/2637 370/335 |
| 2002/0080792 | A1* | 6/2002 | Rosier | H04L 1/1614 370/394 |
| 2002/0141367 | A1* | 10/2002 | Hwang | H04J 13/0003 370/335 |
| 2003/0043764 | A1* | 3/2003 | Kim | H04L 1/0003 370/329 |
| 2003/0169741 | A1* | 9/2003 | Torsner | H04L 1/1819 370/394 |
| 2003/0185159 | A1* | 10/2003 | Seo | H04L 1/0026 370/278 |
| 2004/0148396 | A1* | 7/2004 | Meyer | H04L 1/1685 709/227 |
| 2005/0013263 | A1* | 1/2005 | Kim | H04L 1/0068 370/320 |
| 2005/0201319 | A1* | 9/2005 | Lee | H04L 1/0073 370/321 |
| 2005/0213540 | A1* | 9/2005 | Matsumoto | H04L 1/1809 370/331 |
| 2006/0034277 | A1* | 2/2006 | Jang | H04L 1/1614 370/389 |
| 2006/0092972 | A1* | 5/2006 | Petrovic | H04L 1/0083 370/469 |
| 2006/0171353 | A1* | 8/2006 | Nagata | H04B 7/04 370/329 |
| 2006/0291410 | A1* | 12/2006 | Herrmann | H04L 1/1607 370/328 |
| 2007/0064635 | A1* | 3/2007 | Obuchi | H04W 28/26 370/310 |
| 2007/0091810 | A1* | 4/2007 | Kim | H04L 1/1635 370/236 |
| 2007/0113138 | A1* | 5/2007 | Kwon | H04L 1/0017 714/748 |
| 2007/0168827 | A1 | 7/2007 | Lohr et al. | |
| 2007/0189224 | A1* | 8/2007 | Usuda | H04W 52/286 370/332 |
| 2007/0245201 | A1* | 10/2007 | Sammour | H04L 1/1628 714/748 |
| 2007/0274342 | A1* | 11/2007 | Kim | H04L 1/1607 370/473 |
| 2007/0300120 | A1* | 12/2007 | Kim | H04L 1/1851 714/749 |
| 2008/0002688 | A1* | 1/2008 | Kim | H04L 1/1812 370/389 |
| 2008/0043619 | A1* | 2/2008 | Sammour | H04L 1/1685 370/231 |
| 2008/0043651 | A1* | 2/2008 | Okamoto | H04L 1/1835 370/310 |
| 2008/0089314 | A1* | 4/2008 | Meyer | H04L 47/10 370/349 |
| 2008/0209297 | A1* | 8/2008 | Chandra | H04L 1/1838 714/748 |
| 2008/0219204 | A1* | 9/2008 | Lee | H04L 1/1812 370/315 |
| 2008/0219291 | A1* | 9/2008 | Obuchi | H04L 1/1887 370/469 |
| 2008/0301515 | A1* | 12/2008 | Sagfors | H04L 1/1812 714/748 |
| 2009/0006778 | A1* | 1/2009 | Sidi | H04L 1/1835 711/154 |
| 2009/0103500 | A1* | 4/2009 | Malkamaki | H04L 1/1812 370/336 |
| 2009/0129317 | A1* | 5/2009 | Che | H04L 1/1614 370/328 |
| 2009/0168731 | A1* | 7/2009 | Zhang | H04L 1/1854 370/336 |
| 2009/0175245 | A1* | 7/2009 | Harada | H04L 1/0007 370/336 |
| 2009/0219914 | A1* | 9/2009 | Harada | H04L 1/16 370/345 |
| 2009/0239566 | A1* | 9/2009 | Pelletier | H04W 56/005 455/517 |
| 2009/0271679 | A1* | 10/2009 | Harada | H04L 1/1822 714/748 |
| 2009/0307554 | A1* | 12/2009 | Marinier | H04L 1/1812 714/748 |
| 2009/0323564 | A1* | 12/2009 | Chiu | H04L 1/1812 370/280 |
| 2009/0327829 | A1* | 12/2009 | Yang | H04L 1/1829 714/749 |
| 2010/0027538 | A1* | 2/2010 | Harada | H04L 1/1607 370/389 |
| 2010/0046371 | A1* | 2/2010 | Sundararajan | H04L 1/004 370/235 |
| 2010/0046374 | A1* | 2/2010 | Ludwig | H04L 47/10 370/236 |
| 2010/0046520 | A1* | 2/2010 | Nakata | H04L 1/1867 370/394 |
| 2010/0098006 | A1* | 4/2010 | Golitschek Edler Von Elbwart | H04L 1/1861 370/329 |
| 2010/0153803 | A1* | 6/2010 | Harada | H04L 1/16 714/748 |
| 2010/0184478 | A1* | 7/2010 | Shiga | H04L 1/08 455/556.2 |
| 2010/0223523 | A1* | 9/2010 | Dinan | H04L 1/0003 714/749 |
| 2010/0260049 | A1* | 10/2010 | Racz | H04L 1/187 370/235 |
| 2010/0325508 | A1* | 12/2010 | Hu | H04L 1/1829 714/749 |
| 2010/0332936 | A1* | 12/2010 | Ji | H04L 1/1822 714/748 |
| 2011/0013565 | A1* | 1/2011 | Yahagi | H04L 1/1607 370/328 |
| 2011/0044243 | A1* | 2/2011 | Yi | H04L 1/1812 370/328 |
| 2011/0149919 | A1* | 6/2011 | Kapoor | H04L 1/1812 370/336 |
| 2011/0219287 | A1* | 9/2011 | Srinivas | H03M 13/07 714/781 |
| 2011/0274023 | A1* | 11/2011 | Roh | H04L 1/1692 370/311 |
| 2012/0009876 | A1* | 1/2012 | Everaere | G06F 1/3209 455/41.2 |
| 2012/0093073 | A1* | 4/2012 | Lunttila | H04L 1/1607 370/328 |
| 2012/0182914 | A1* | 7/2012 | Hariharan | H04L 1/1614 370/311 |
| 2013/0039192 | A1* | 2/2013 | Kubota | H04L 1/187 370/242 |

(56) References Cited

U.S. PATENT DOCUMENTS

2013/0225184 A1* 8/2013 Liu .................... H04W 72/042
　　　　　　　　　　　　　　　　　　　　　　455/450

FOREIGN PATENT DOCUMENTS

| KR | 10-2007-0108460 A | 11/2007 |
| KR | 10-2009-0049415 A | 5/2009 |
| KR | 10-2009-0128231 A | 12/2009 |
| KR | 10-2010-0060927 A | 6/2010 |
| KR | 10-2010-0076843 A | 7/2010 |

* cited by examiner (PRIOR)

APPARATUS AND METHOD FOR TRANSMITTING FEEDBACK INFORMATION IN WIRELESS COMMUNICATION SYSTEMS

TECHNICAL FIELD OF THE INVENTION

The present invention relates generally to a wireless communication system. More particularly, the present invention relates to an apparatus and a method for transmitting Hybrid Automatic Repeat reQuest (HARQ) feedback information in a wireless communication system.

BACKGROUND OF THE INVENTION

A wireless communication system can have an error in transmission data according to channel status of a radio resource carrying the data. Hence, to raise transmission reliability, the wireless communication system controls and corrects the data error using HARQ as shown in FIG. 1.

FIG. 1 depicts a method for transmitting HARQ feedback information in a conventional wireless communication system.

As shown in FIG. 1, when a transmitting end 100 transmits packets to a receiving end 110, the receiving end 110 transmits HARQ feedback information of the received packets to the transmitting end 100 after Transmission Time Interval (x TTIs) 120 pass from the packet reception time. Here, the HARQ feedback information includes ACK indicating reception success information of the packet, NACK indicating reception failure information of the packet, and Discontinuous Transmission (DTX) indicating that the packet reception is not confirmed.

When the transmitting end 100 receives the NACK for a packet 1, the transmitting end 100 retransmits the packet 1 to the receiving end 110 after a retransmission time interval (y TTIs) 122 passes from the NACK reception time.

Using the HARQ scheme as above, the receiving end 110 transmits the HARQ feedback information to the transmitting end 100 for the packets received from the transmitting end 100. In this case, the receiving end needs to activate 130 a transmission power amplifier to transmit the HARQ feedback information though there is no data to transmit through an uplink, and thus power is consumed inefficiently.

Thus, the wireless communication system requires a method for reducing the inefficient power consumption according to the HARQ feedback information transmission in the receiving end.

SUMMARY OF THE INVENTION

To address the above-discussed deficiencies of the prior art, it is a primary aspect of the present invention to provide an apparatus and a method for transmitting HARQ feedback information in a receiving end of a wireless communication system.

Another aspect of the present invention is to provide an apparatus and a method for reducing power consumption according to HARQ feedback information transmission in a receiving end of a wireless communication system.

Yet another aspect of the present invention is to provide an apparatus and a method for transmitting HARQ feedback information for a plurality of received packets using a single feedback signal in a receiving end of a wireless communication system.

Still another aspect of the present invention is to provide an apparatus and a method for retransmitting a packet by considering HARQ feedback information of a plurality of packets confirmed in a single feedback signal, in a transmitting end of a wireless communication system.

A further aspect of the present invention is to provide an apparatus and a method for selectively using a plurality of feedback modes in a wireless communication system.

According to one aspect of the present invention, a method for transmitting HARQ feedback information in a receiving end of a wireless communication system includes confirming the number of packets received from a transmitting end, and when receiving a reference number of packets from the transmitting end, transmitting to the transmitting end a feedback signal comprising HARQ feedback information for the reference number of the packets.

According to another aspect of the present invention, a method for confirming HARQ feedback information in a transmitting end of a wireless communication system includes transmitting a packet to a receiving end; and when receiving a feedback signal from the receiving end, confirming HARQ feedback information for a reference number of packets in the feedback signal.

According to yet another aspect of the present invention, an apparatus for transmitting HARQ feedback information in a receiving end of a wireless communication system includes a receiver for receiving a packet; a controller for controlling to confirm the number of packets received from a transmitting end through the receiver, and when receiving a reference number of packets from the transmitting end, to transmit to the transmitting end a feedback signal comprising HARQ feedback information for the reference number of the packets; and a transmitter for transmitting the feedback signal to the transmitting end.

According to still another aspect of the present invention, an apparatus for confirming HARQ feedback information in a transmitting end of a wireless communication system includes a transmitter for transmitting a packet to a receiving end; a receiver for receiving a feedback signal from the receiving end; and a controller for, when receiving the feedback signal from the receiving end, confirming HARQ feedback information for a reference number of packets in the feedback signal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a technique for efficiently transmitting HARQ feedback information in a wireless communication system. Here, HARQ feedback indicates a series of operations of a receiving end for reporting the reception status of a packet received from a transmitting end, to the transmitting end. The HARQ feedback information includes ACK indicating successful reception of the packet, NACK indicating reception failure of the packet, and Discontinuous Transmission (DTX) indicating that the packet reception is not confirmed.

Hereafter, the transmitting end includes a certain node, such as base station and terminal, for transmitting the packet in a network. The receiving end includes a certain node, such as base station and terminal, for receiving the packet from the transmitting end in the network.

Figure 1:
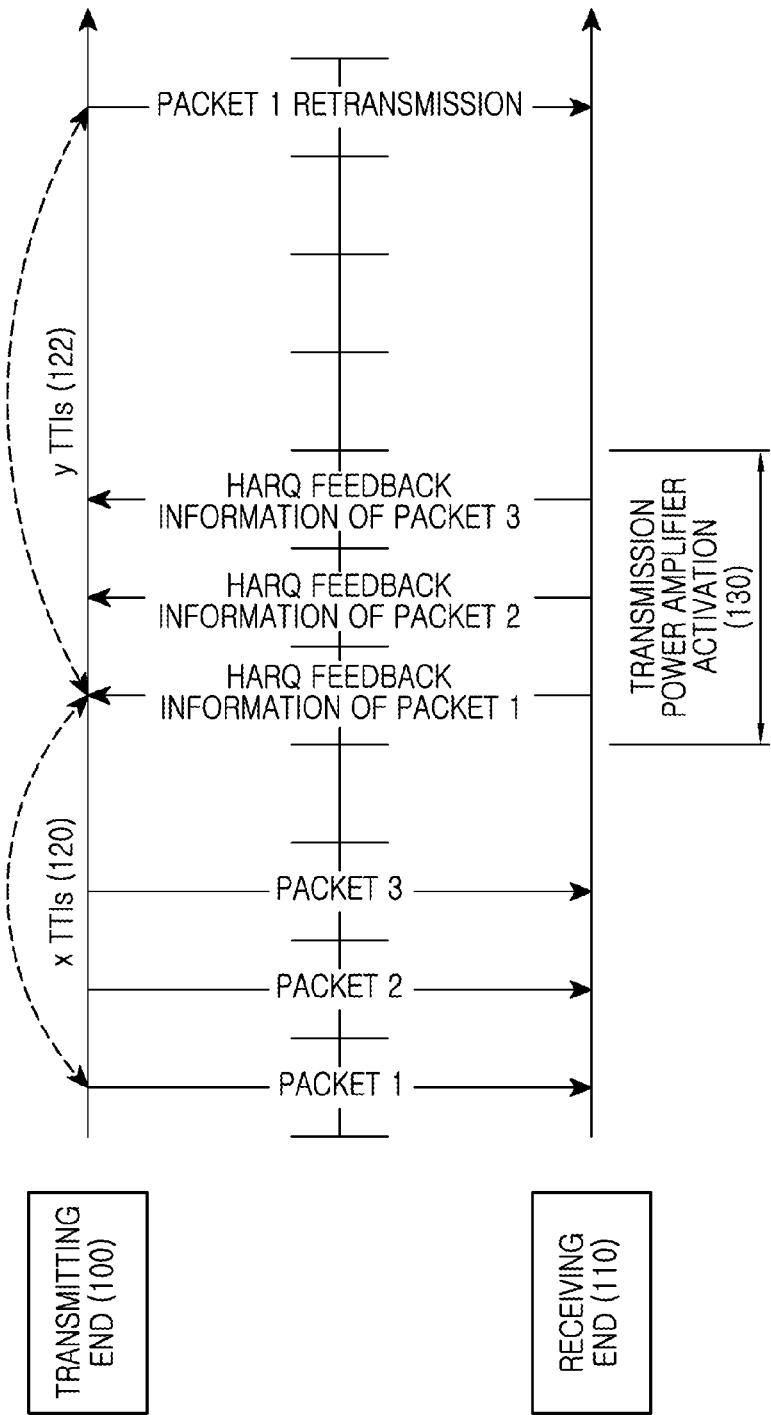
FIG. 1 illustrates a method for transmitting HARQ feedback information in a conventional wireless communication system.
Figure 2:
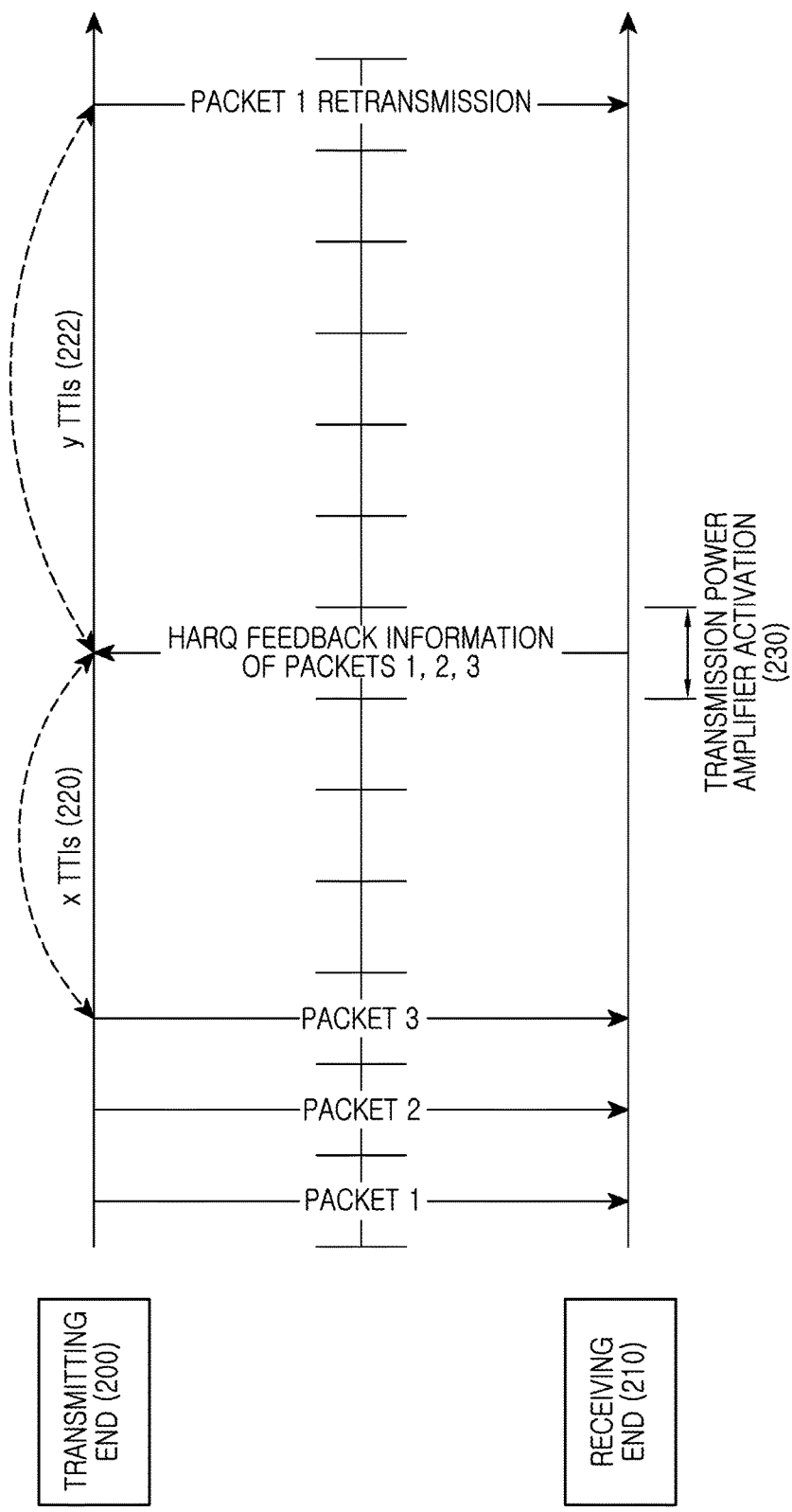
FIG. 2 illustrates a method for transmitting HARQ feedback information in a wireless communication system according to one exemplary embodiment of the present invention.

FIG. 2 illustrates a method for transmitting HARQ feedback information in a wireless communication system according to one exemplary embodiment of the present invention.

As shown in FIG. 2, when a transmitting end 200 transmits packets, a receiving end 210 does not transmit HARQ feedback information until $N_{AG}$-ary packets are received from the transmitting end 200. When receiving the $N_{AG}$-ary packets, the receiving end 210 transmits HARQ feedback information of the $N_{AG}$-ary packets to the transmitting end 200 using a single feedback signal after Transmission Time Intervals (x TTIs) 220 elapse from the reception of the $N_{AG}$-ary packets. For example, when $N_{AG}$ is 3, the receiving end 210 transmits the HARQ feedback information of three packets to the transmitting end 200 using the single feedback signal after the transmission time interval x TTIs 220 elapses from the reception of the three packets. Here, the x TTI can be set to a first reference value predefined between the transmitting end 200 and the receiving end 210, or to a certain time beyond the first reference value.

The transmitting end 200 confirms the HARQ feedback information of the $N_{AG}$-ary packets in the feedback signal received from the receiving end 210. When the receiving end 210 requests packet retransmission, the transmitting end 200 retransmits the packet requested by the receiving end 210 to retransmit, to the receiving end 210 after a retransmission time interval y TTIs 222 elapses from the reception of the feedback signal. For example, when the HARQ feedback information of a packet 1 is NACK, the transmitting end 200 recognizes that the receiving end 210 requests to retransmit the packet 1. Accordingly, the transmitting end 200 retransmits the packet 1 to the receiving end 210 after the retransmission time interval y TTIs 222 elapses from the reception of the feedback signal. Herein, the y TTI can be set to a second reference value predefined between the transmitting end 200 and the receiving end 210, or to a certain time beyond the second reference value.

When the receiving end 210 requests to retransmit a plurality of packets, the transmitting end 200 retransmits the corresponding packets after the retransmission time interval y TTIs 222 elapses from the reception of the feedback signal. For example, when synchronous HARQ is applied, the transmitting end 200 sequentially retransmits the packets in a preset retransmission order after the retransmission time interval y TTIs 222 elapses from the reception of the feedback signal. In so doing, the transmitting end 200 may not transmit a control message for the retransmitted packets. For example, when asynchronous HARQ is applied, the transmitting end 200 can retransmit the packets at an arbitrary time after the retransmission time interval y TTIs 222 elapses from the reception of the feedback signal. In so doing, the transmitting end 200 transmits the control message including identification information of the retransmitted packets to the receiving end 210.

As such, the receiving end 210 transmits the HARQ feedback information of the $N_{AG}$-ary packets to the transmitting end 200 using the single feedback signal. In so doing, the receiving end 210 can generate the feedback signal to indicate the HARQ feedback information of the $N_{AG}$-ary packets. For example, the receiving end 210 may generate a 1-bit feedback signal by logically operating the HARQ feedback information of the $N_{AG}$-ary packets. For example, the receiving end 210 transmits to the transmitting end the 1-bit feedback signal generated by applying AND operation to the HARQ feedback information of the $N_{AG}$-ary packets.

Figure 3:
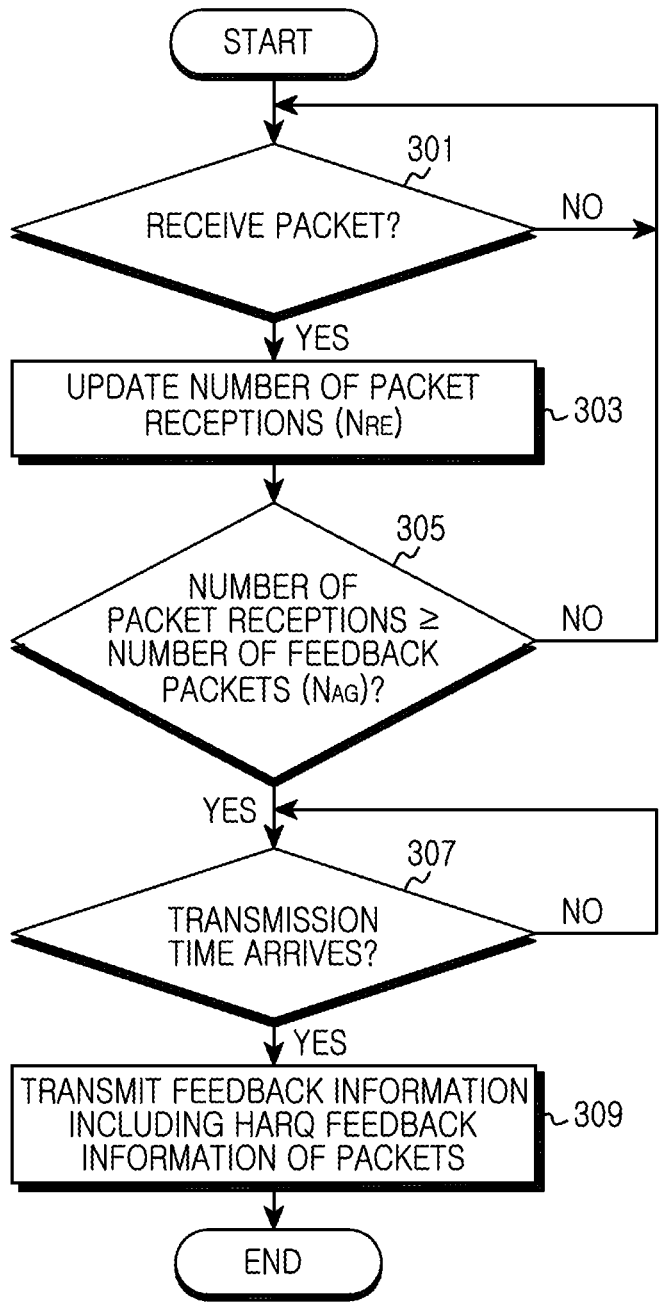
FIG. 3 illustrates a method for transmitting the HARQ feedback information in a receiving end according to one exemplary embodiment of the present invention.

FIG. 3 illustrates a method for transmitting the HARQ feedback information in the receiving end according to one exemplary embodiment of the present invention.

Referring to FIG. 3, the receiving end determines whether the packet is received from the transmitting end in step 301.

When receiving the packet from the transmitting end, the receiving end updates (NRE++) the number of the packet receptions (NRE) in step 303. Here, the number of the packet receptions is a variable for determining the HARQ feedback transmission time and can be set to 0 as an initial value.

In step 305, the receiving end determines whether the number of the packet receptions is greater than or equal to the number of the feedback packets $N_{AG}$ to determine whether to transmit the HARQ feedback information.

When the number of the packet receptions is smaller than the number of the feedback packets $N_{AG}$ (NRE<$N_{AG}$), the receiving end recognizes no HARQ feedback information transmission. Hence, the receiving end determines whether the packet is received from the transmitting end in step 301.

By contrast, when the number of the packet receptions is greater than or equal to the number of the feedback packets $N_{AG}$ (NRE≥$N_{AG}$), the receiving end recognizes the HARQ feedback information transmission. Hence, the receiving end determines whether the HARQ feedback information transmission time arrives in step 307. For example, the receiving end determines whether the HARQ feedback information transmission time arrives after the transmission time interval x TTIs 220 from the reception of the $N_{AG}$-th packet as shown in FIG. 2. At this time, the receiving end initializes the number of the packet receptions in order to determine whether to transmit the next HARQ feedback information.

When the HARQ feedback information transmission time arrives, the receiving end transmits the HARQ feedback information of the $N_{AG}$-ary packets to the transmitting end using the single feedback signal in step 309.

Next, the receiving end finishes this algorithm.

In this embodiment, the receiving end receives the $N_{AG}$-ary packets and then maintains a standby mode during the transmission time interval to transmit the HARQ feedback information of the $N_{AG}$-ary packets. In so doing, the receiving end may stand by during the transmission time interval to transmit the HARQ feedback information of the $N_{AG}$-ary packets, and receive the packet from the transmitting end through another HARQ process as shown in FIG. 3.

Figure 4:
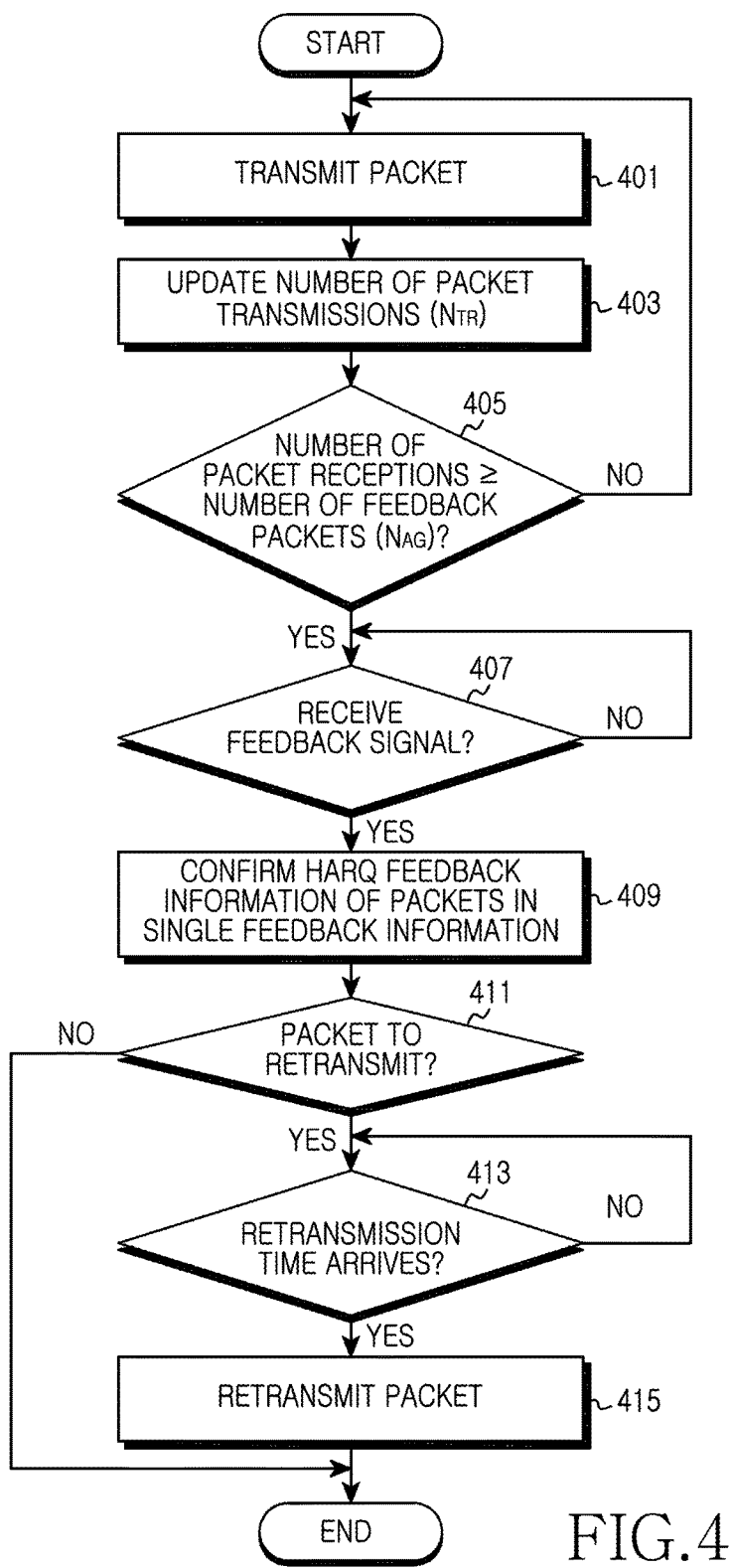
FIG. 4 illustrates a method for confirming the HARQ feedback information in a transmitting end according to one exemplary embodiment of the present invention.

When the receiving end transmits the HARQ feedback information of the $N_{AG}$-ary packets to the transmitting end using the single feedback signal as mentioned above, the transmitting end can confirm the HARQ feedback information of the packets as shown in FIG. 4.

FIG. 4 illustrates a method for confirming the HARQ feedback information in the transmitting end according to one exemplary embodiment of the present invention.

Referring to FIG. 4, the transmitting end transmits the packet to the receiving end in step 401.

After transmitting the packet to the receiving end, the transmitting end updates (NTR++) the number of the packet transmissions in step 403. Here, the number of the packet transmissions is a variable for confirming the HARQ feedback transmission time of the receiving end, and can be set to 0 as the initial value.

In step 405, the transmitting end determines whether the number of the packet transmissions is greater than or equal to the number of the feedback packets $N_{AG}$ to confirm the HARQ feedback information transmission time of the receiving end.

When the number of the packet transmissions is smaller than the number of the feedback packets $N_{AG}$ (NTR<$N_{AG}$), the transmitting end recognizes no HARQ feedback information transmission of the receiving end. Hence, when having a packet to transmit to the receiving end, the transmitting end transmits the packet to the receiving end in step 401.

By contrast, when the number of the packet transmissions is greater than or equal to the number of the feedback packets $N_{AG}$ (NTR≥$N_{AG}$), the transmitting end recognizes that the receiving end transmits the HARQ feedback information after the transmission time interval. Hence, the transmitting end determines whether the feedback signal is received from the receiving end in step 407. In so doing, the transmitting end initializes the number of the packet transmissions to confirm the transmission time of the next HARQ feedback information of the receiving end.

When receiving the feedback signal from the receiving end, the transmitting end confirms the HARQ feedback information of the $N_{AG}$-ary packets in the feedback signal received from the receiving end in step 409.

In step 411, the transmitting end determines whether the receiving end requests to retransmit a packet. For example, the transmitting end determines whether the packets transmitted to the receiving end includes the packet including the NACK as the HARQ feedback information.

When the receiving end requests to retransmit the packet, the transmitting end determines whether a retransmission time arrives in step 413. For example, the transmitting end 200 determines whether the retransmission time arrives after the retransmission time interval y TTIs 222 elapses from the reception of the feedback signal as shown in FIG. 2.

When the retransmission time arrives, the transmitting end retransmits the packet requested by the receiving end to retransmit, to the receiving end in step 415. For example, when retransmitting a plurality of packets using the synchronous HARQ, the transmitting end sequentially retransmits the corresponding packets in a preset retransmission order after the retransmission time interval passes from the reception of the feedback signal. In so doing, the transmitting end may not transmit the control message for the retransmitted packets. For example, when retransmitting a plurality of packets using the asynchronous HARQ, the transmitting end retransmits the corresponding packets at an arbitrary time after the retransmission time interval elapses from the reception of the feedback signal. In so doing, the transmitting end transmits the control message including the identification information of the retransmitted packets to the receiving end.

Next, the transmitting end finishes this algorithm.

In the above embodiment, the transmitting end transmits the $N_{AG}$-ary packets and then maintains the standby mode until the HARQ feedback information of the $N_{AG}$-ary packets are received. In so doing, the transmitting end may stand by until the HARQ feedback information of the $N_{AG}$-ary packets are received, and transmit the packet to the receiving end through another HARQ process as shown in FIG. 4.

Figure 5:
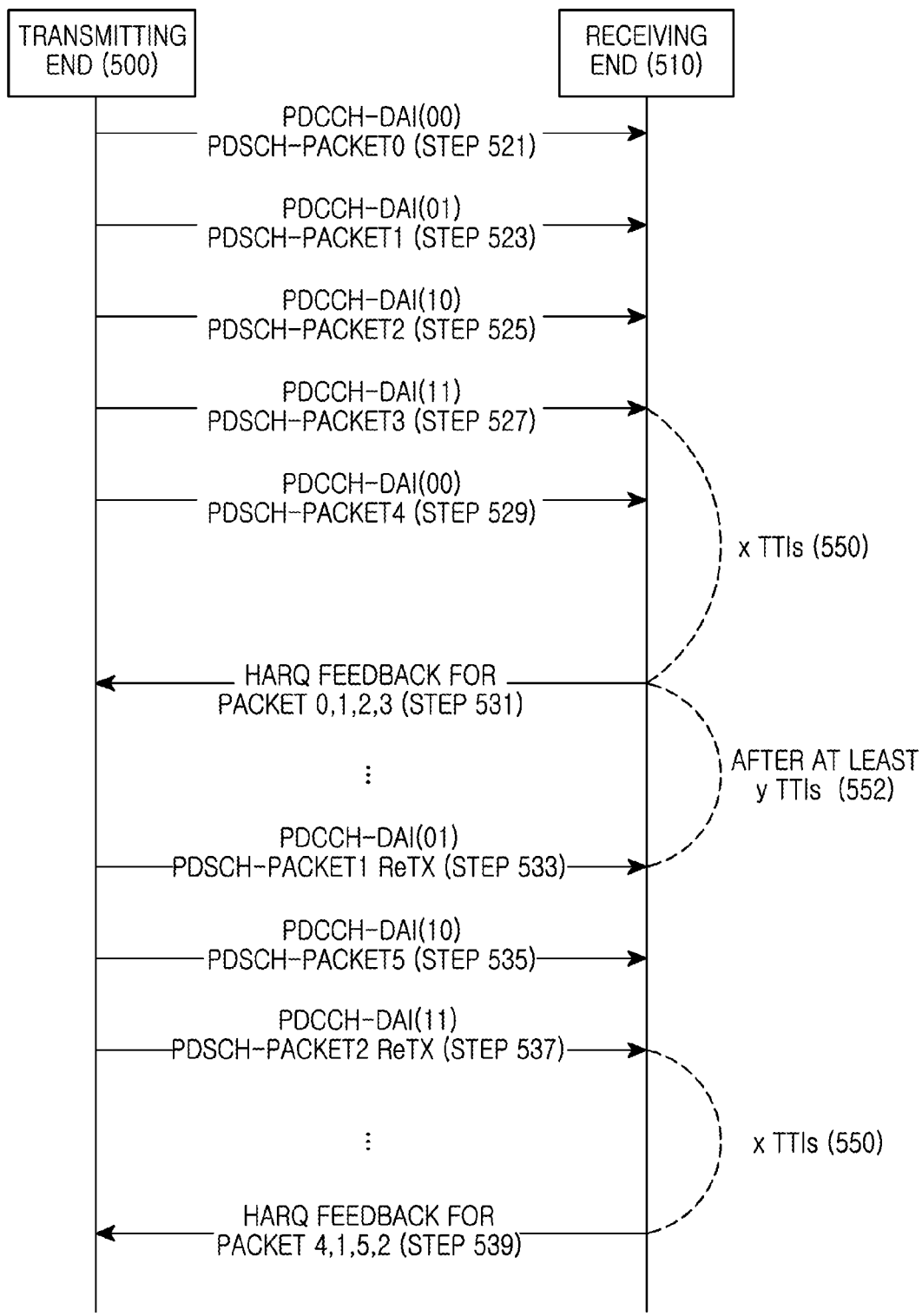
FIG. 5 illustrates a method for retransmitting a packet in the wireless communication system according to one exemplary embodiment of the present invention.
Figure 6:
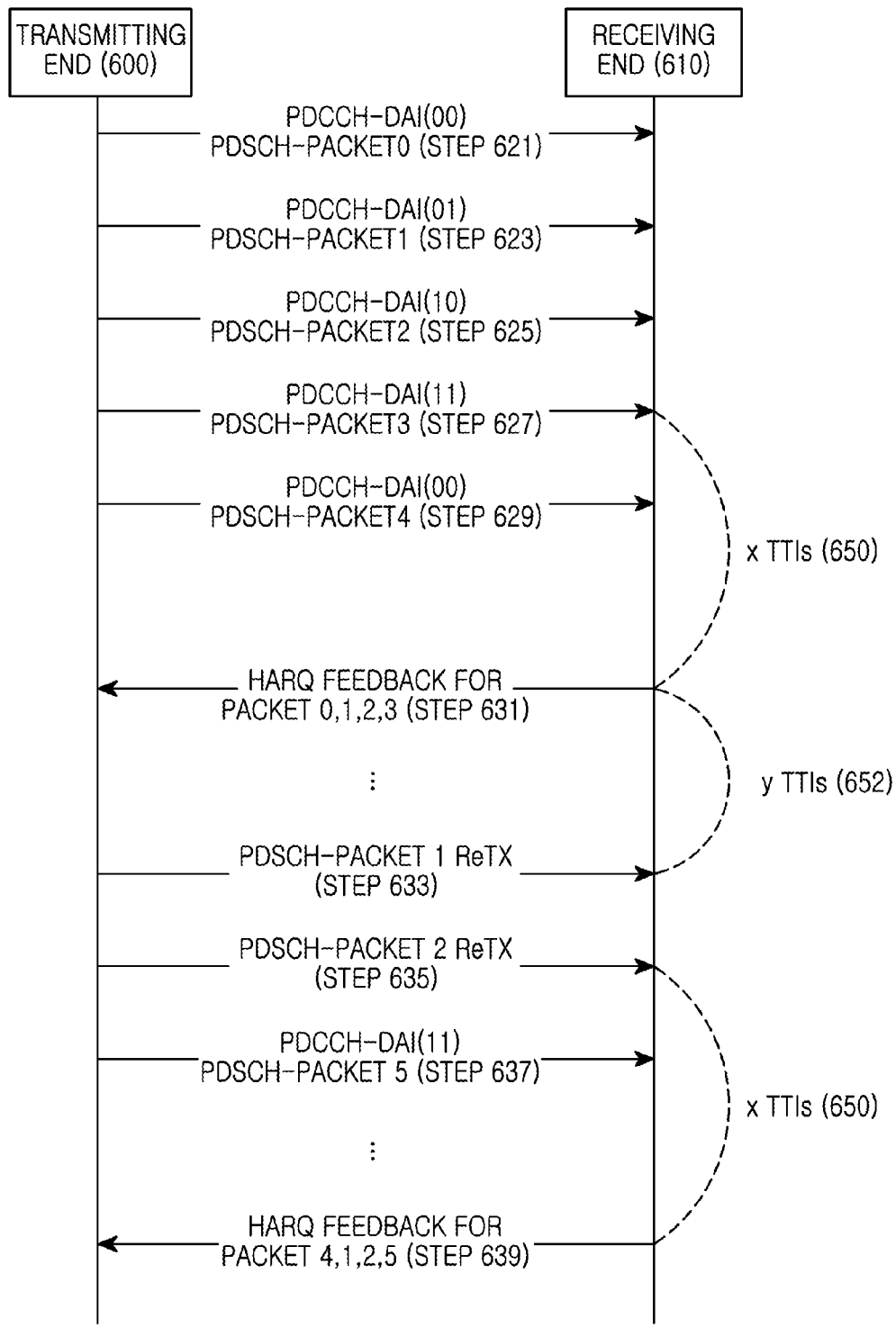
FIG. 6 illustrates a method for retransmitting the packet in the wireless communication system according to another exemplary embodiment of the present invention.

As above, when the receiving end transmits the HARQ feedback information of the $N_{AG}$-ary packets to the transmitting end using the single feedback signal, it is important for the receiving end to recognize the reception time of the packet for the transmission time of the feedback signal. For example, in case of 3GPP LTE standard, the receiving end can confirm the packet transmission time from the transmitting end to the receiving end in Downlink Control Information (DCI) received through a Physical Downlink Control Channel (PDCCH). However, when the receiving end cannot receive the DCI due to a reception error, the receiving end cannot recognize the packet reception time and can make an error in recognizing the feedback signal transmission time. Hence, the transmitting end adds a packet index to the control information indicating whether the packet is transmitted to the receiving end, and transmits to the receiving end as shown in FIG. 5 and FIG. 6. Here, the packet index (Downlink Assignment Index (DAI)) is in a size indicating the number of the packets carrying the HARQ feedback information using the single feedback signal in the receiving end. For example, when the receiving end transmits to the transmitting end the HARQ feedback information of four packets using the single feedback signal, the packet index includes 2 bits.

Hereafter, it is assumed that the wireless communication system uses the G3PP LTE standard. Accordingly, it is assumed that the control information of the transmitting end for notifying whether the packet is transmitted to the receiving end indicates the DCI transmitted over the PDCCH, and the packet is transmitted over a Physical Downlink ShARed Channel (PDSCH). Also, the receiving end is assumed to transmit the HARQ feedback information of four packets to the transmitting end using the feedback signal.

FIG. 5 illustrates a method for retransmitting the packet in the wireless communication system according to one exemplary embodiment of the present invention.

As shown in FIG. 5, a transmitting end 500 sequentially transmits a packet 0, a packet 1, a packet 2, a packet 3, and a packet 4 to a receiving end 510 over the PDSCH in steps 521 through 529. In so doing, the transmitting end 500 transmits the packet index of each packet to the receiving end 510 using the DCI transmitted through the PDCCH. For example, when transmitting the packet 0, the transmitting end 500 transmits the DCI including a packet identifier '00' of the packet 0 to the receiving end 510 over the PDCCH in step 521. When transmitting the packet 1, the transmitting end 500 transmits the DCI including the packet identifier '01' of the packet 1 to the receiving end 510 over the PDCCH in step 523. Also, when transmitting the packet 2, the transmitting end 500 transmits the DCI including the packet identifier '10' of the packet 2 to the receiving end 510 over the PDCCH in step 525. When transmitting the packet 3, the transmitting end 500 transmits the DCI including the packet identifier '11' of the packet 3 to the receiving end 510 over the PDCCH in step 527. Next, when transmitting the packet 4, the transmitting end 500 transmits the DCI including the packet identifier '00' of the packet 4 to the receiving end 510 over the PDCCH in step 529. That is, the receiving end 510 transmits to the transmitting end 500 the feedback signal including the HARQ feedback information of the packets 0, 1, 2, and 3 and the HARQ feedback information of the packet 4 using another feedback signal. Hence, the transmitting end 500 sets the packet identifier of the packet 4 to '00'.

When receiving the four packets from the packet 0 to the packet 3 from the transmitting end 500 in steps 521 through 527, the receiving end 510 transmits the HARQ feedback information of the four packets to the transmitting end 500 using the single feedback signal after the transmission time interval x TTIx 550 elapses from the reception of the packet 3 in step 531.

The transmitting end 500 confirms the HARQ feedback information of the packets 0, 1, 2, and 3 in the feedback signal provided from the receiving end 510.

When the receiving end 510 requests to retransmit the packet 1 and the packet 2, the transmitting end 500 retransmits the packet 1 and the packet 2 to the receiving end 510 after the retransmission time interval y TTIs 552 elapses from the reception of the feedback signal in steps 533 and 537. When transmitting the DCI of the retransmitted packet, the transmitting end 500 retransmits the packet 1 and the packet 2 to the receiving end 510 at an arbitrary time after the retransmission time interval y TTIs 552 elapses from the reception of the feedback signal. In this case, the transmitting end 500 sequentially allocates the packet identifiers regardless of the newly transmitted packet and the retransmitted packet. For example, when transmitting the packet 4 and then retransmitting the packet 1, the transmitting end 500 transmits the DCI including the packet identifier '01' of the packet 1 to the receiving end 510 over the PDCCH in step 533. Next, when sequentially transmitting the packet 5 and the packet 2, the transmitting end 500 transmits the DCI including the packet identifier '10' of the packet 5 to the receiving end 510 over the PDCCH in step 535, and transmits the DCI including the packet identifier '11' of the packet 2 to the receiving end 510 over the PDCCH in step 537.

When receiving the packet 4, the packet 1, the packet 5, and the packet 2 in steps 529 and 533 through 537, the receiving end 510 transmits the HARQ feedback information of the four packets to the transmitting end 500 using the single feedback signal after the transmission time interval x TTIx 550 elapses from the reception of the packet 2 in step 539.

In this embodiment, the transmitting end 500 transmits the control information DCI of the retransmitted packet to the receiving end 501.

In another embodiment, when not transmitting the control information of the retransmitted packet to the receiving end 501, the transmitting end 500 transmits the retransmitted packet to the receiving end 510 as shown in FIG. 6.

FIG. 6 illustrates a method for retransmitting the packet in the wireless communication system according to another exemplary embodiment of the present invention.

As shown in FIG. 6, a transmitting end 600 sequentially transmits a packet 0, a packet 1, a packet 2, a packet 3, and a packet 4 to a receiving end 610 over the PDSCH in steps 621 through 629. In so doing, the transmitting end 600 transmits the packet index of each packet to the receiving end 610 using the DCI transmitted through the PDCCH. For example, the transmitting end 600 transmits the DCI including the packet identifier '00' of the packet 0 to the receiving end 610 over the PDCCH in step 621, and transmits the DCI including the packet identifier '01' of the packet 1 to the receiving end 610 over the PDCCH in step 623. Also, the transmitting end 600 transmits the DCI including the packet identifier '10' of the packet 2 to the receiving end 610 over the PDCCH in step 625, and transmits the DCI including the packet identifier '11' of the packet 3 to the receiving end 610 over the PDCCH in step 627. Next, when transmitting the packet 4, the transmitting end 600 transmits the DCI including the packet identifier '00' of the packet 4 to the receiving end 610 over the PDCCH in step 629. That is, the receiving end 610 transmits to the transmitting end 600 the feedback signal including the HARQ feedback information of the packets 0, 1, 2, and 3 and the HARQ feedback information of the packet 4 using another feedback signal. Hence, the transmitting end 600 sets the packet identifier of the packet 4 to '00'.

When receiving the four packets from the packet 0 to the packet 3 from the transmitting end 600 in steps 621 through 627, the receiving end 610 transmits the HARQ feedback information of the four packets to the transmitting end 600 using the single feedback signal after the transmission time interval x TTIx 650 elapses from the reception of the packet 3 in step 631.

The transmitting end 600 confirms the HARQ feedback information of the packets 0, 1, 2, and 3 in the feedback signal provided from the receiving end 610.

When the receiving end 610 requests to retransmit the packet 1 and the packet 2, the transmitting end 600 retransmits the packet 1 and the packet 2 to the receiving end 610 after the retransmission time interval y TTIs 652 elapses from the reception of the feedback signal. In so doing, when not transmitting the DCI of the retransmitted packet, the transmitting end 600 sequentially retransmits the packet 1 and the packet 2 to the receiving end 610 after the retransmission time interval y TTIs 652 elapses from the reception of the feedback signal. In this case, the transmitting end 600 sequentially allocates the packet identifiers regardless of the newly transmitted packet and the retransmitted packet. For example, when transmitting the packet 4 and then retransmitting the packet 1 and the packet 2, the transmitting end 600 sets the packet identifier '01' of the packet 1 and sets the packet identifier '10 of the packet 2. Hence, when retransmitting the packet 1 and the packet 2 and then transmitting the packet 5, the transmitting end 600 transmits the DCI including the packet identifier '11' of the packet 5 to the receiving end 610 over the PDCCH in step 637.

When receiving the packet 4, the packet 1, the packet 2, and the packet 5 in steps 629 and 633 through 637, the receiving end 610 transmits the HARQ feedback information of the four packets to the transmitting end 600 using the single feedback signal after the transmission time interval x TTIs 650 elapses from the reception of the packet 5 in step 639.

As such, when the transmitting end transmits the control information including the packet index to the receiving end, the receiving end can recognize the presence of the unreceived packet unless the packet indexes of the packets received from the transmitting end is sequential. In this case, the receiving end transmits the unreceived packet information to the transmitting end in order to prevent the transmission time error of the feedback signal.

As such, when the receiving end includes and transmits the HARQ feedback information of the $N_{AG}$-ary packets using the feedback signal, the receiving end does not transmit the HARQ feedback information to the transmitting end until the $N_{AG}$-ary packets are received. Hence, when receiving $N_{AG}$-1-ary packets and then receiving no $N_{AG}$-th packet for a long time, the receiving end may continuously maintain the HARQ process for the $N_{AG}$-1-ary packets because it does not transmit the HARQ feedback information of the $N_{AG}$-1-ary packets.

Figure 7:
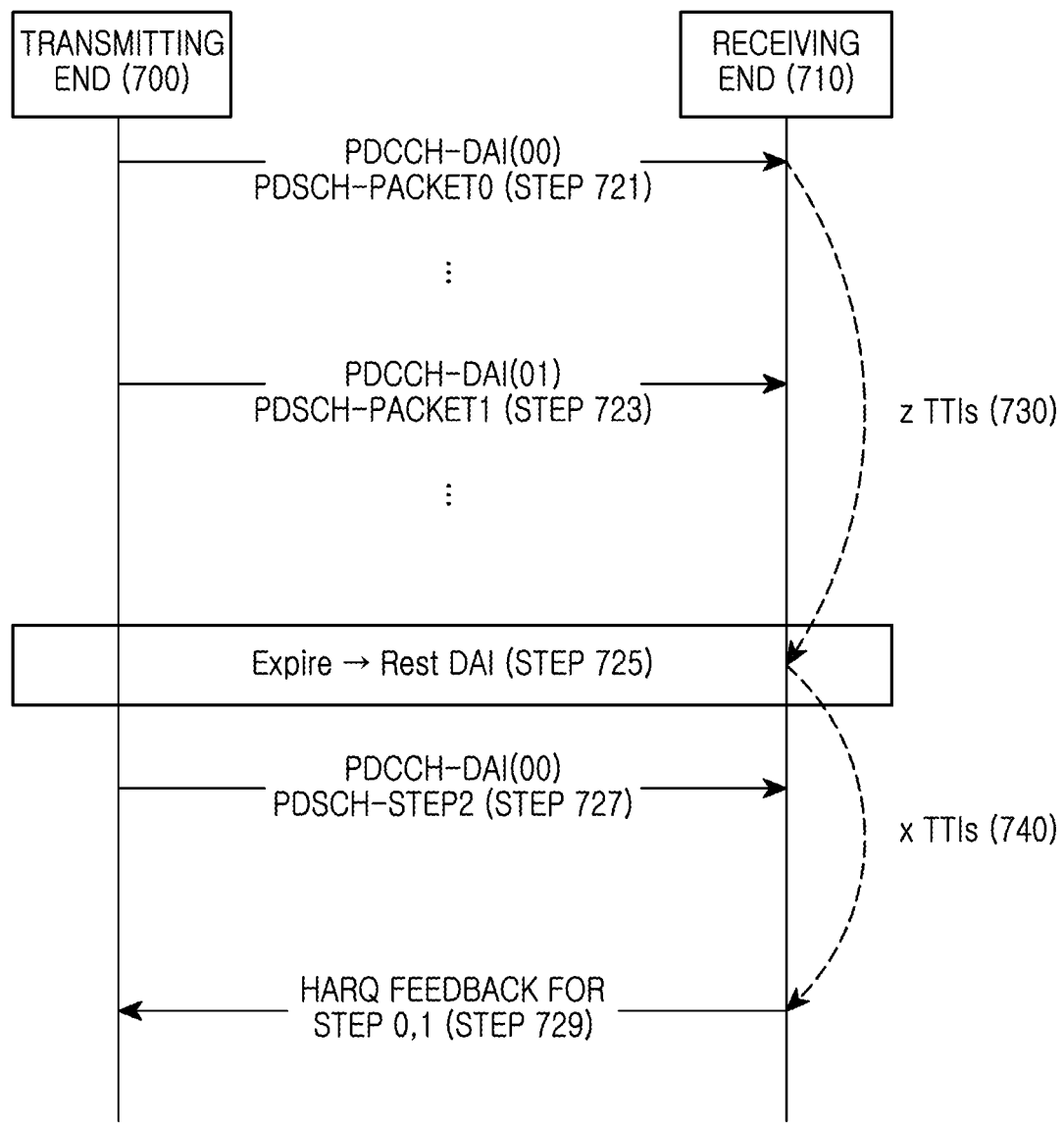
FIG. 7 illustrates a method for transmitting the HARQ feedback information in the wireless communication system according to another exemplary embodiment of the present invention.

To address this, when receiving the first packet and then not receiving the last packet to transmit the HARQ feedback information within a reference time z TTIs as shown in FIG. 7, the receiving end of the wireless communication system transmits the HARQ feedback information of at least one packet received so far, to the transmitting end using the feedback signal.

FIG. 7 illustrates a method for transmitting the HARQ feedback information in the wireless communication system according to another exemplary embodiment of the present invention.

As shown in FIG. 7, a transmitting end 700 sequentially transmits a packet 0 and a packet 1 to a receiving end 710 over the PDSCH in steps 721 through 723. In so doing, the transmitting end 700 transmits the packet index of each packet to the receiving end 710 using the DCI transmitted through the PDCCH. For example, the transmitting end 700 transmits the DCI including the packet identifier '00' of the packet 0 to the receiving end 710 over the PDCCH in step 721, and transmits the DCI including the packet identifier '01' of the packet 1 to the receiving end 710 over the PDCCH in step 723.

When receiving the packet 0 of the packet identifier '00' in step 721, the receiving end 710 drives a first timer for determining the HARQ feedback transmission time. In so doing, when receiving the packet of the packet identifier '00', the receiving end 710 resets the first timer.

When not receiving the $N_{AG}$-ary packets to transmit the HARQ feedback information until the driving time z TTIs 730 of the first timer expires in step 725, the receiving end 710 transmits the HARQ feedback information of the packet 0 and the packet 1 received, to the transmitting end 700 using the single feedback signal after the transmission time interval x TTIs 740 elapses from the expiration (step 725) of the first timer, in step 729.

After transmitting the packet 0 of the packet identifier '00', the transmitting end 700 drives a second timer for recognizing the HARQ feedback transmission time of the receiving end 710. In so doing, when transmitting the packet of the packet identifier '00', the transmitting end 700 resets the second timer.

When the driving time z TTIs 730 of the second timer expires, the transmitting end 700 recognizes that the receiving end 710 transmits the HARQ feedback information of the packets from the packet of the packet identifier '00' to the packet transmitted so far. Hence, the transmitting end 700 sets the packet identifier '00' of the packet 2 transmitted after the expiration of the second timer driving time and transmits to the receiving end 710 in step 727. At this time, the transmitting end 700 resets the second timer.

Figure 8:
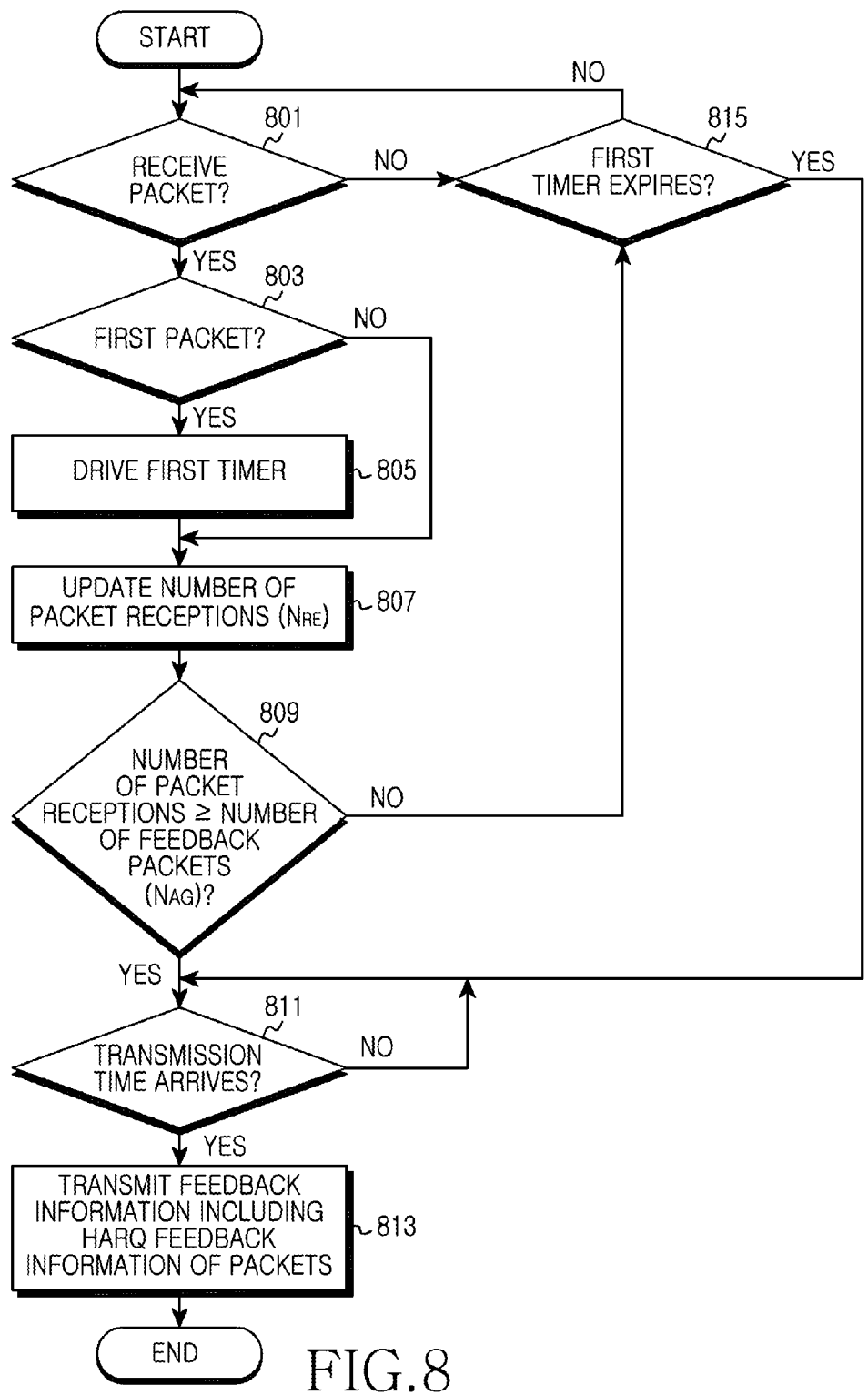
FIG. 8 illustrates a method for transmitting the HARQ feedback information in the receiving end according to another exemplary embodiment of the present invention.

FIG. 8 illustrates a method for transmitting the HARQ feedback information in the receiving end according to another exemplary embodiment of the present invention.

Referring to FIG. 8, the receiving end determines whether the packet is received from the transmitting end in step 801.

When not receiving the packet from the transmitting end, the receiving end determines whether the driving of the first timer for determining the HARQ feedback transmission time expires in step 815.

By contrast, when receiving the packet from the transmitting end, the receiving end determines whether the received packet is the first packet for the HARQ feedback in step 803. For example, the receiving end determines whether the packet index of the received packet is '00'.

When not receiving the first packet for the HARQ feedback, the receiving end updates (NRE++) the number of the packet receptions NRE in step 807. Here, the number of the packet receptions is the variable for determining whether to transmit the HARQ feedback and can be set to 0 as the initial value.

By contrast, when receiving the first packet for the HARQ feedback, the receiving end resets the first timer in step 805.

Next, the receiving end updates (NRE++) the number of the packet receptions NRE in step 807.

After updating the number of the packet receptions, the receiving end determines whether the number of the packet receptions is greater than or equal to the number of the feedback packets $N_{AG}$ to determine whether to transmit the HARQ feedback information in step 809.

When the number of the packet receptions is smaller than the number of the feedback packets $N_{AG}$ (NRE<$N_{AG}$), the receiving end recognizes no HARQ feedback information transmission. Hence, the receiving end determines whether the driving time of the first timer expires in step 815.

When the driving time of the first timer does not expire, the receiving end determines whether the packet is received from the transmitting end in step 801.

By contrast, when the driving of the first timer expires, the receiving end recognizes to transmit the HARQ feedback information for the packets from the first packet for the HARQ feedback to at least one packet currently received. Hence, the receiving end determines whether the transmission time arrives in step 811. For example, the receiving end determines whether the transmission time interval x TTIs 740 elapses from the expiration of the first timer driving in step 725 as shown in FIG. 7. At this time, the receiving end initializes the number of the packet receptions to determine whether to transmit the next HARQ feedback information.

By contrast, when the number of the packet receptions is greater than or equal to the number of the feedback packets $N_{AG}$ (NRE≥$N_{AG}$) in step 809, the receiving end recognizes to transmit the HARQ feedback information. Hence, the receiving end determines whether the transmission time arrives in step 811. For example, the receiving end 210 determines whether the transmission time interval x TTIs 220 elapses from the reception of the $N_{AG}$-th packet as shown in FIG. 2. At this time, the receiving end initializes the number of the packet receptions to determine whether to transmit the next HARQ feedback information.

When the transmission time arrives, the receiving end transmits the HARQ feedback information of at least one packet to the transmitting end using the single feedback signal in step 813. For example, when the driving of the first timer expires, the receiving end transmits the HARQ feedback information of the packets from the first packet for the HARQ feedback to the at least one packet from currently received, to the transmitting end using the single feedback signal. For example, when receiving $N_{AG}$-ary packets, the receiving end transmits the HARQ feedback information of the $N_{AG}$-ary packets to the transmitting end 200 using the single feedback signal.

Next, the receiving end finishes this algorithm.

Figure 9:
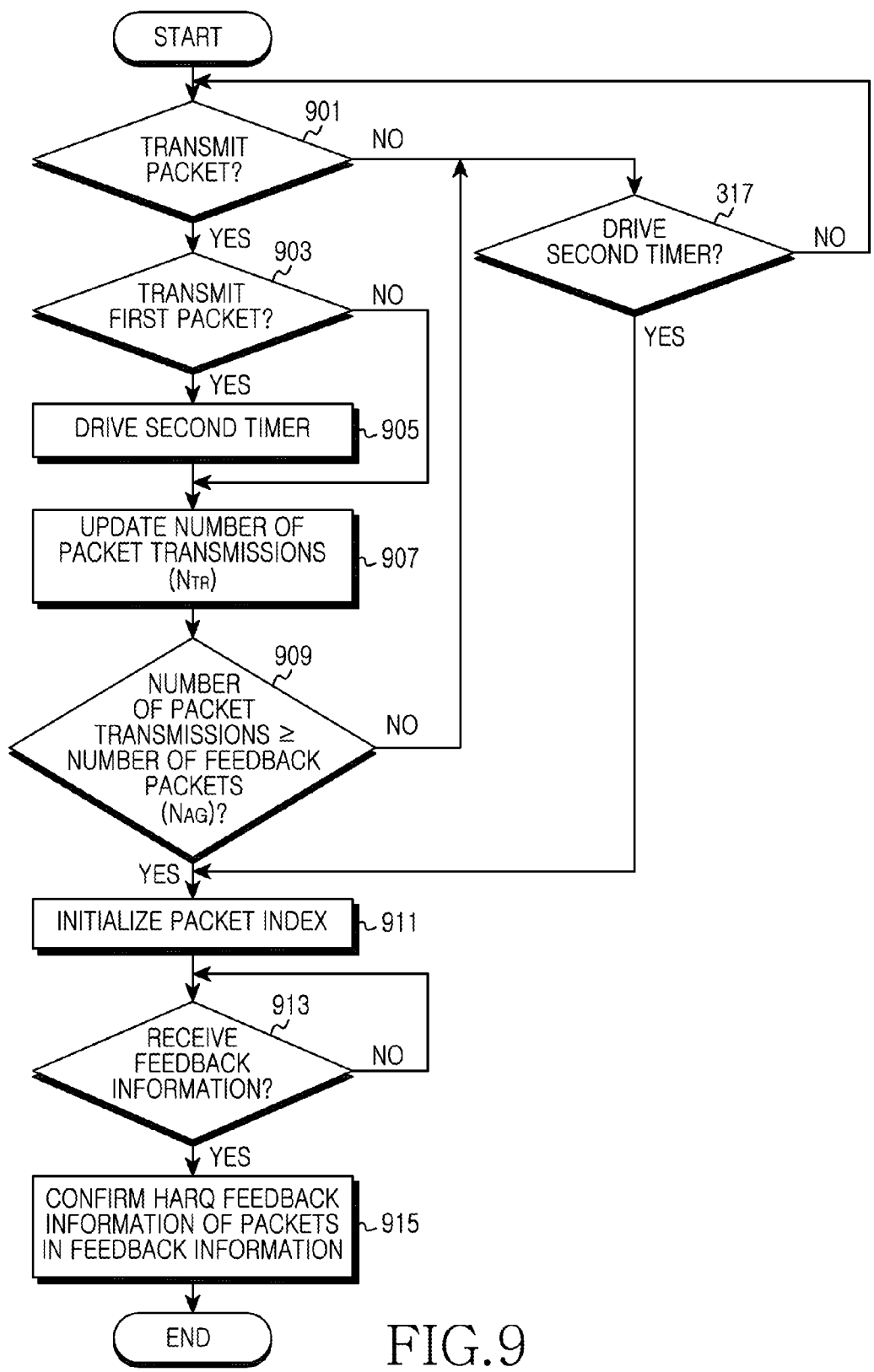
FIG. 9 illustrates a method for confirming the HARQ feedback information in the transmitting end according to another exemplary embodiment of the present invention.

As such, when the receiving end transmits the HARQ feedback information of at least one packet using the single feedback signal, the transmitting end can confirm the HARQ feedback information of at least one packet as shown in FIG. 9.

FIG. 9 illustrates a method for confirming the HARQ feedback information in the transmitting end according to another exemplary embodiment of the present invention.

Referring to FIG. 9, the transmitting end determines whether to transmit the packet to the receiving end in step 901.

When the receiving end does not transmit the packet, the transmitting end determines whether the driving of the second timer for recognizing the HARQ feedback transmission time of the receiving end expires in step 917.

By contrast, when transmitting the packet to the receiving end, the transmitting end determines whether the packet transmitted to the receiving end is the first packet for the HARQ feedback of the receiving end in step 903. For example, the transmitting end determines whether the packet index of the packet transmitted to the receiving end is '00'

When the packet transmitted to the receiving end is not the first packet for the HARQ feedback, the transmitting end updates (NTR++) the number of the packet transmissions NTR in step 907. Here, the number of the packet transmissions is the variable for confirming the HARQ feedback transmission time of the receiving end, and can be set to 0 as the initial value.

When the packet transmitted to the receiving end is the first packet for the HARQ feedback, the receiving end resets the second timer in step 905.

Next, the receiving end updates (NTR++) the number of the packet transmissions NTR in step 907.

After updating the number of the packet transmissions, the transmitting end determines whether the number of the packet transmissions is greater than or equal to the number of the feedback packets $N_{AG}$ to confirm the HARQ feedback information transmission time of the receiving end in step 909.

When the number of the packet transmissions is smaller than the number of the feedback packets $N_{AG}$ (NTR<$N_{AG}$), the transmitting end recognizes no HARQ feedback information transmission of the receiving end. Hence, the transmitting end determines whether the driving of the second timer expires in step 917.

When the driving of the second timer does not expire, the transmitting end determines whether to transmit the packet to the receiving end in step 901.

By contrast, when the driving of the second timer expires, the transmitting end recognizes to transmit the HARQ feedback information for the packets from the first packet for the HARQ feedback to the at least one packet currently received from the receiving end. Hence, the transmitting end initializes the packet index in step 911. That is, after the driving of the second timer expires, the transmitting end sets the packet identifier of the packet transmitted first or retransmitted, to '00'. In so doing, the transmitting end initializes the number of the packet transmissions to determine the transmission time of the next HARQ feedback information of the receiving end.

Meanwhile, when the number of the packet transmissions is greater than or equal to the number of the feedback packets $N_{AG}$ (NTR≥$N_{AG}$) in step 909, the transmitting end recognizes that the receiving end transmits the HARQ feedback information after the transmission time interval. Hence, the transmitting end initializes the packet index in step 911. That is, the transmitting end sets the packet identifier of the packet transmitted next or retransmitted, to '00'. In so doing, the transmitting end initializes the number of the packet transmissions to determine the transmission time of the next HARQ feedback information of the receiving end.

Next, the transmitting end determines whether the feedback signal is received from the receiving end in step 913.

When receiving the feedback signal from the receiving end, the transmitting end confirms the HARQ feedback information of at least one packet in the feedback signal received from the receiving end in step 915. For example, when the driving of the second timer expires, the transmitting end confirms the HARQ feedback information of the first packet for the HARQ feedback and at least one packet transmitted to the receiving end until the driving of the second timer expires, in the feedback signal received from the receiving end. For example, when the driving of the second timer does not expire, the transmitting end confirms the HARQ feedback information of the $N_{AG}$-ary packets in the feedback signal received from the receiving end.

Next, the transmitting end finishes this algorithm. Although it is not illustrated, the transmitting end may retransmit at least one packet by considering the HARQ feedback information of at least one packet transmitted to the receiving end as shown in FIG. 4.

As such, the receiving end can transmit the HARQ feedback information of the plurality of the packets to the transmitting end through the single feedback signal transmission and thus reduce resource waste according to the HARQ feedback. However, the receiving end needs to accurately obtain the packet transmission of the transmitting end and thus can transmit the HARQ feedback information of the plurality of the packets to the transmitting end through the single feedback signal transmission.

Figure 10:
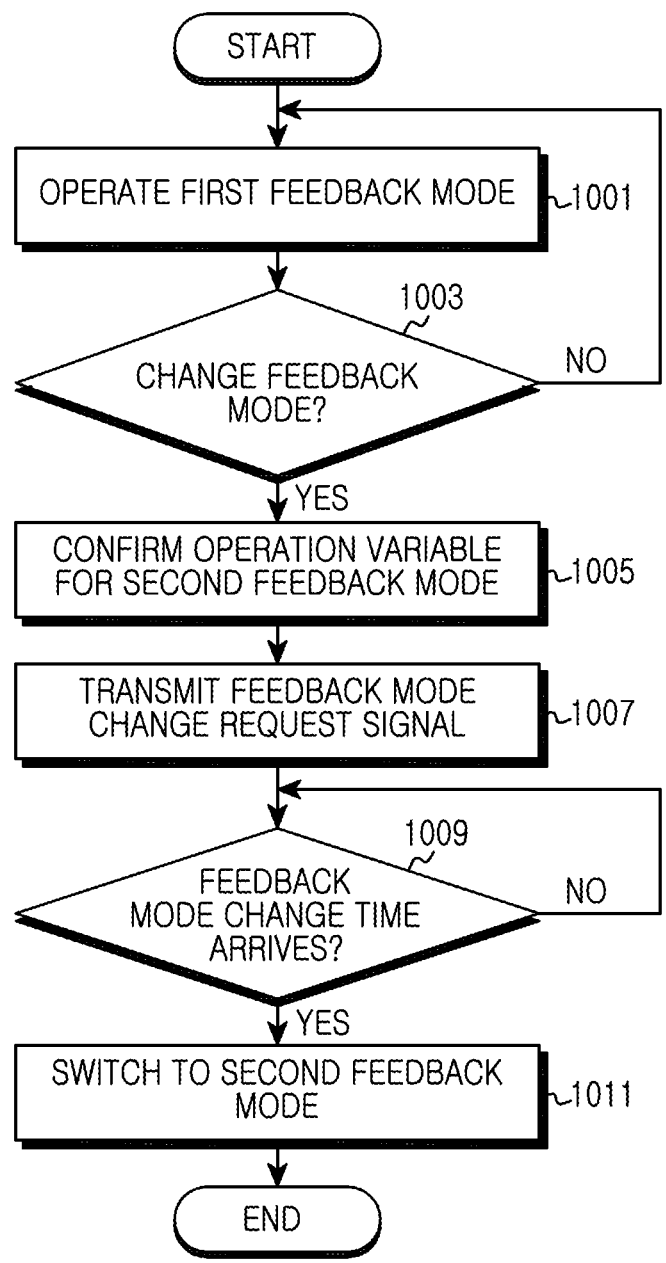
FIG. 10 illustrates a method for switching a feedback mode in the transmitting end according to an exemplary embodiment of the present invention.

Thus, the wireless communication system may selectively use a plurality of feedback modes by considering at least one of a service characteristic and a channel characteristic. In this case, the transmitting end can control the feedback mode of the receiving end as shown in FIG. 10. Hereafter, it is assumed that the transmitting end changes the feedback mode from a first feedback mode to a second feedback mode. However, the transmitting end may change the feedback mode from the second feedback mode to the first feedback mode in the same manner. Here, the first feedback mode is assumed to indicate a feedback mode of the receiving end for transmitting the HARQ feedback information of each packet to the transmitting end, and the second feedback mode is assumed to indicate a feedback mode of the receiving end for transmitting the HARQ feedback information of the multiple packets to the transmitting end using the single feedback signal.

FIG. 10 illustrates a method for switching the feedback mode in the transmitting end according to an exemplary embodiment of the present invention.

Referring to FIG. 10, the transmitting end receives the HARQ feedback information of the packet transmitted to the receiving end, in the first feedback mode. For example, the transmitting end receives the HARQ feedback information of each packet transmitted to the receiving end, from the receiving end.

Next, the transmitting end determines whether to change the feedback mode in step 1003. For example, the transmitting end determines whether to change the feedback mode by considering at least one of the service characteristics provided to the receiving end and the channel characteristic in relation to the receiving end.

When not changing the feedback mode, the transmitting end receives the HARQ feedback information of the packet transmitted to the receiving end, in the first feedback mode in step 1001.

By contrast, when changing the feedback mode, the transmitting end confirms an operation variable for the second feedback mode in step 1005. For example, the transmitting end determines the operation variable for the second feedback mode including at least one of the number of the packets of the receiving end for carrying the HARQ feedback information at one time, the transmission time interval x TTIs of the receiving end, the retransmission time interval y TTIs of the transmitting end, and a feedback mode change time.

After confirming the operation variable for the second feedback mode, the transmitting end transmits a feedback mode change request signal to the receiving end in step 1007. In so doing, the feedback mode change request signal includes the operation variable for the second feedback mode confirmed in step 1005.

In step 1009, the transmitting end determines whether the feedback mode change time arrives in step 1009.

When the feedback mode change time arrives, the transmitting end switches to the second feedback mode in step 1011. Hence, the transmitting end can confirm the HARQ feedback information of the multiple packets in the feedback signal received from the receiving end as shown in FIG. 3 or FIG. 9.

Next, the transmitting end finishes this algorithm.

Figure 11:
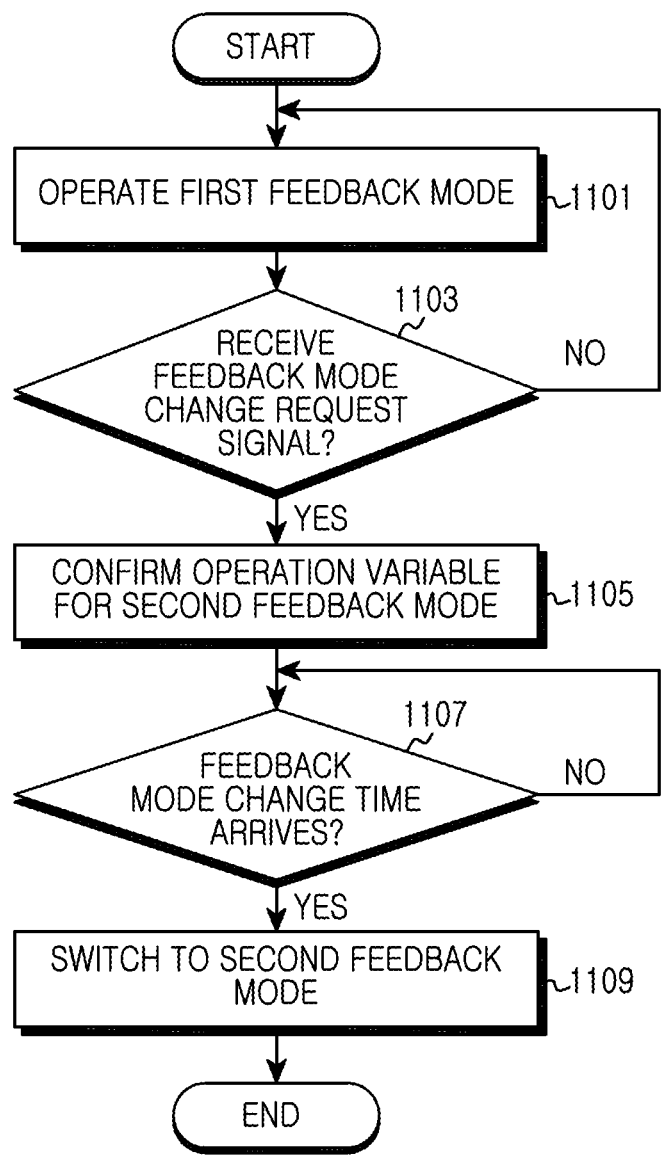
FIG. 11 illustrates a method for switching the feedback mode in the receiving end according to an exemplary embodiment of the present invention.

As such, when the transmitting end controls the feedback mode of the receiving end, the receiving end can change the feedback mode as shown in FIG. 11.

FIG. 11 illustrates a method for switching the feedback mode in the receiving end according to an exemplary embodiment of the present invention.

Referring to FIG. 11, the receiving end receives the HARQ feedback information of the packet received from the transmitting end according to the first feedback mode in step 1101. For example, the receiving end transmits the HARQ feedback information of each packet received from the transmitting end, to the transmitting end.

In step 1103, the receiving end determines whether the feedback mode change request signal is received from the transmitting end.

When receiving the feedback mode change request signal from the transmitting end, the receiving end confirms the operation variable for the second feedback mode in the feedback mode change request signal in step 1105. Here, the operation variable for the second feedback mode includes at least one of the number of the packets of the receiving end for carrying the HARQ feedback information at one time, the transmission time interval x TTIs of the receiving end, the retransmission time interval y TTIs of the transmitting end, and the feedback mode change time.

After confirming the operation variable for the second feedback mode, the receiving end determines whether a feedback mode change time arrives in step 1107.

When the feedback mode change time arrives, the receiving end switches to the second feedback mode in step 1109. Hence, the receiving end transmits the HARQ feedback information of the $N_{AG}$-ary packets to the transmitting end using the single feedback signal as shown in FIG. 2 or FIG. 8.

Next, the receiving end finishes this algorithm.

Figure 12:
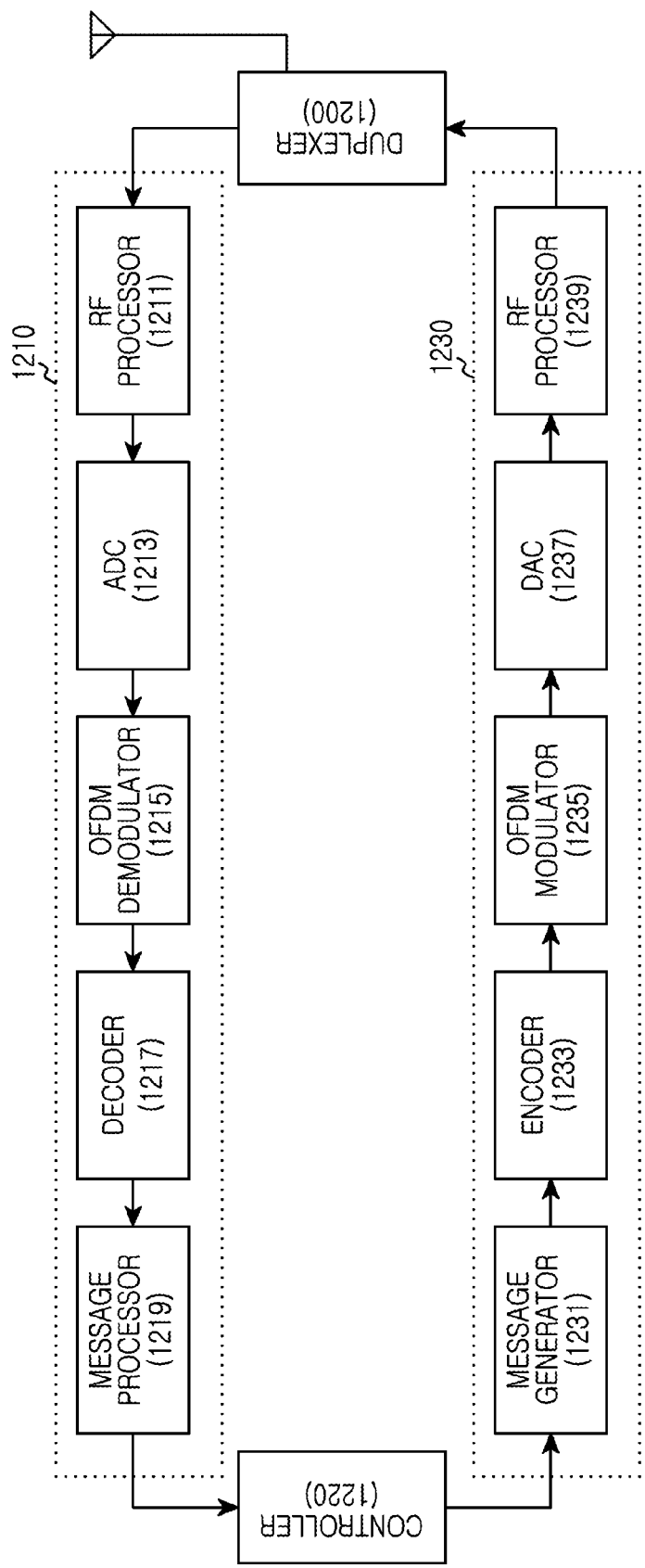
FIG. 12 illustrates the transmitting end according to an exemplary embodiment of the present invention.

FIG. 12 is a block diagram of the transmitting end according to an exemplary embodiment of the present invention.

As shown in FIG. 12, the transmitting end includes a duplexer 1200, a receiver 1210, a controller 1220, and a transmitter 1230.

The duplexer 1200 transmits the transmit signal output from the transmitter 1230 over an antenna and provides the receive signal from the antenna to the receiver 1210 according to the duplexing.

The receiver 1210 processes the packet and the control information provided from the receiving end by converting a radio frequency signal provided from the duplexer 1200 to a baseband signal. For example, the receiver 1210 can include an RF processor 1211, an Analog/Digital Convertor (ADC) 1213, an OFDM demodulator 1215, a decoder 1217, and a message processor 1219.

The RF processor 1211 converts the radio frequency signal fed from the duplexer 1200 to a baseband analog signal. The ADC 1213 converts the analog signal provided from the RF processor 1211 to digital sample data.

The OFDM demodulator 1215 converts time-domain sample data provided from the ADC 1213 to frequency-domain data through Fast Fourier Transform (FFT).

The decoder 1217 selects data of subcarriers to actually receive from the frequency-domain data provided from the OFDM demodulator 1215. Next, the decoder 1217 demodulates and decodes the selected data at a preset modulation level (MCS level).

The message processor 1219 confirms the control information in the signal provided from the decoder 1217 and sends to the controller 1220. For example, the message processor 1219 sends the feedback signal provided from the receiving end to the controller 1220.

The controller 1220 controls to transmit the packet to the receiving end. In so doing, the controller 1220 allocates the packet index to each packet by considering the number of the packets transmitted to the receiving end as shown in FIG. 5 or FIG. 6.

The controller 1220 confirms the HARQ feedback information of the multiple packets in the feedback signal provided from the message processor 1219. When there is the packet requested by the receiving end to retransmit, the controller 1220 controls to retransmit the corresponding packet. In so doing, the controller 1220 controls to retransmit the packet after the retransmission time interval y TTIs elapses from the reception of the feedback signal. For example, when retransmitting a plurality of packets using the synchronous HARQ, the controller 1220 sequentially retransmits the corresponding packets in the preset retransmission order after the retransmission time interval y TTIs passes from the reception of the feedback signal. In so doing, the controller 1220 may not transmit the control message for the retransmitted packets. For example, when retransmitting a plurality of packets using the asynchronous HARQ, the controller 1220 retransmits the corresponding packets at an arbitrary time after the retransmission time interval y TTIs elapses from the reception of the feedback signal. In so doing, the controller 1220 controls a message generator 1231 to transmit the control message including the identification information of the retransmitted packets to the receiving end.

The transmitter 1230 converts the packet and the control information to transmit to the receiving end, to an RF signal, and transmits to the outside via the duplexer 1220 and the antenna. For example, the transmitter 1230 can include the message generator 1231, an encoder 1233, an OFDM modulator 1235, a Digital/Analog Convertor (DAC) 1237, and an RF processor 1239.

The message generator 1231 generates the control message under the control of the controller 1220. For example, the message generator 1231 generates the feedback mode change request signal including the operation variable for the feedback mode change under the control of the controller 1220. For example, the message generator 1231 generates the control information including the packet index.

The encoder 1233 encodes and modulates the transmit packet and the control message generated by the message generator 1231 at the corresponding modulation level (MCS level).

The OFDM modulator 1235 converts time-domain sample data provided from the encoder 1233 to time-domain sample data (OFDM symbol) through Inverse Fast Fourier Transform (IFFT).

The DAC 1237 converts the sample data provided from the OFDM modulator 1235 to the analog signal. The RF processor 1239 converts the baseband analog signal provided from the DAC 837 to the radio frequency signal.

Although it is not depicted, the transmitting end can further include a second timer for recognizing the HARQ feedback transmission time of the receiving end. The second timer is reset under the control of the controller 1220 when the transmitting end transmits the first packet for the HARQ feedback of the receiving end. When the driving time of the second timer expires, the controller 1220 recognizes that the receiving end transmits the HARQ feedback of the packets from the first packet for the HARQ feedback of the receiving end to the packet currently transmitted to the receiving end. Hence, the controller 1220 sets the packet identifier of the packet transmitted first after the driving time of the second timer expires, to '00'. Here, the packet identifier '00' indicates the first packet for the HARQ feedback of the receiver.

Figure 13:
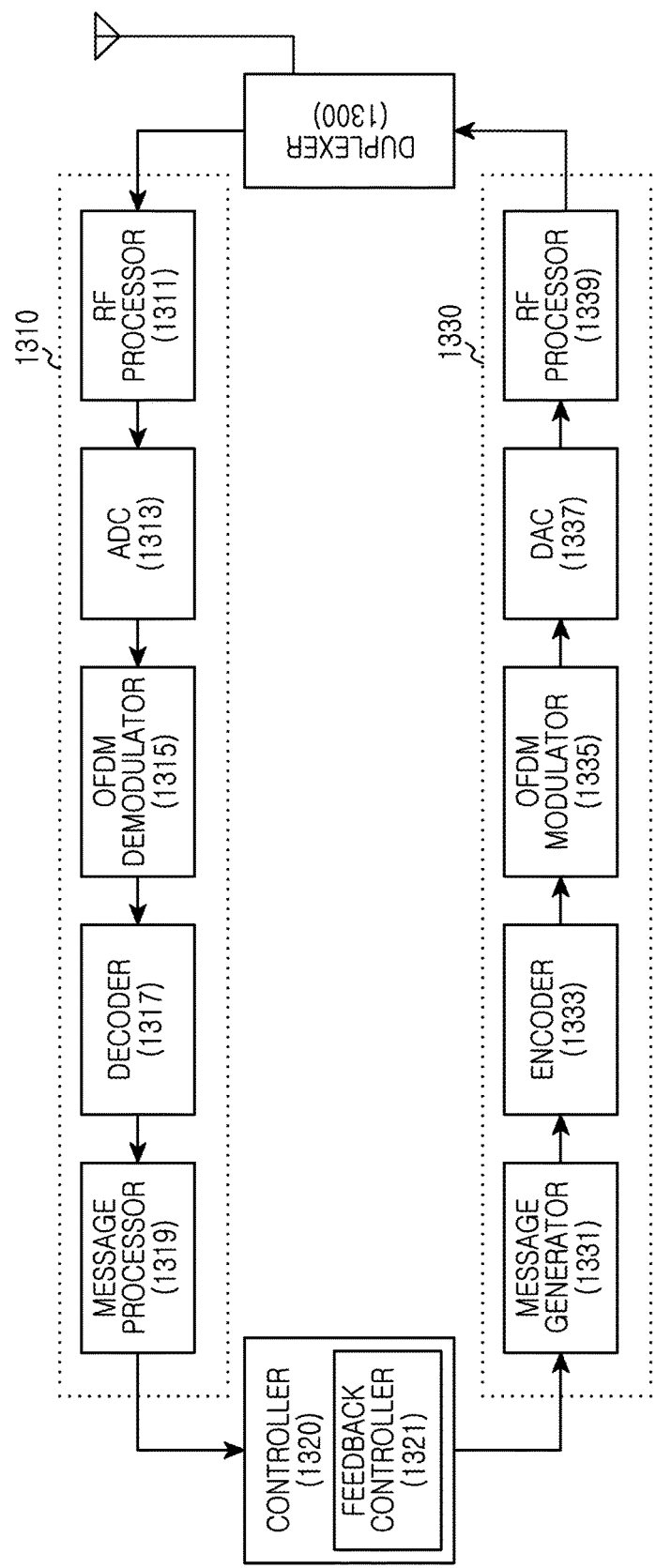
FIG. 13 illustrates the receiving end according to an exemplary embodiment of the present invention.

FIG. 13 is a block diagram of the receiving end according to an exemplary embodiment of the present invention.

As shown in FIG. 13, the receiving end includes a duplexer 1330, a receiver 1310, a controller 1320, and a transmitter 1330.

The duplexer 1300 transmits the transmit signal provided from the transmitter 1330 over an antenna and provides the receive signal from the antenna to the receiver 1310 according to the duplexing.

The receiver 1310 processes the packet and the control information from the transmitting end by converting the radio frequency signal provided from the duplexer 1300 to a baseband signal. For example, the receiver 1310 can include an RF processer 1311, an Analog/Digital Convertor (ADC) 1313, an OFDM demodulator 1315, a decoder 1317, and a message processor 1319.

The RF processor 1311 converts the radio frequency signal provided from the duplexer 1300 to the baseband analog signal. The ADC 1313 converts the analog signal provided from the RF processor 1311 to digital sample data.

The OFDM demodulator 1315 converts time-domain sample data provided from the ADC 1313 to frequency-domain data through the FFT.

The decoder 1317 selects data of subcarriers to actually receive from the frequency-domain data provided from the OFDM demodulator 1315. Next, the decoder 1317 demodulates and decodes the selected data at the preset modulation level (MCS level).

The message processor 1319 confirms the control information in the signal provided from the decoder 1317 and sends to the controller 1320. For example, the message processor 1319 confirms and sends the feedback mode change request signal provided from the transmitting end, to the controller 1320.

The controller 1320 controls overall operation of the receiving end. For example, the controller 1320 controls a feedback controller 1321 to change the feedback mode according to the feedback mode change request signal provided from the transmitting end as shown in FIG. 11.

The feedback controller 1321 controls not to transmit the HARQ feedback information until the $N_{AG}$-ary packets are received. When receiving the $N_{AG}$-ary packets, the feedback controller 1321 controls to transmit the HARQ feedback information of the $N_{AG}$-ary packets to the transmitting end using the single feedback signal after the transmission time interval x TTIs passes from the reception of the $N_{AG}$-th packet as shown in FIG. 3.

When the packet indexes of the packets received from the transmitting end are not sequential, the feedback controller 1321 recognizes that the packets transmitted by the transmitting end include the unreceived packet. In this case, the feedback controller 1321 controls to transmit the unreceived packet information to the transmitting end in order to prevent the transmission time error of the feedback signal.

When the receiving end does not receive the last packet to transmit the HARQ feedback information within the reference time z TTIs after the first packet for transmitting the HARQ feedback information is received, the feedback controller 1321 controls to transmit the HARQ feedback information of the packets from the first packet to at least one packet received so far, to the transmitting end using the feedback signal as shown in FIG. 8.

The transmitter 1330 converts the packet and the control information to transmit to the transmitting end, to the radio frequency signal, and transmits to the outside via the duplexer 1300 and the antenna. For example, the transmitter 1330 can include the message generator 1331, an encoder 1333, an OFDM modulator 1335, a DAC 1337, and an RF processor 1339.

The message generator 1331 generates the control message under the control of the controller 1320. For example, the message generator 1331 generates the feedback signal including the HARQ feedback information of the $N_{AG}$-ary packets under the control of the controller 1320.

The encoder 1333 encodes and modulates the transmit packet and the control message generated by the message generator 1331 at the corresponding modulation level (MCS level).

The OFDM modulator 1335 converts time-domain sample data provided from the encoder 1333 to time-domain sample data (OFDM symbol) through the IFFT.

The DAC 1337 converts the sample data provided from the OFDM modulator 1335 to the analog signal. The RF processor 1339 converts the baseband analog signal provided from the DAC 1337 to the radio frequency signal.

Although it is not depicted, the receiving end can further include an error checker for determining whether the packet received from the transmitting end has an error, and a first timer for determining the HARQ feedback transmission time. The first timer is reset under the control of the controller 1320 when the first packet for the HARQ feedback is received from the transmitting end. When the driving time of the first timer expires, the feedback controller 1321 determines to transmit to the transmitting end the HARQ feedback of the packets from the first packet for the HARQ feedback to the packet received so far.

As set forth above, the receiving end of the wireless communication system transmits the HARQ feedback information of the multiple packets to the transmitting end using the single feedback signal. Thus, the receiving end can lower the power consumption in the HARQ feedback information transmission by reducing the time resource for transmitting the HARQ feedback information.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a receiving end of a wireless communication system, the method comprising:
   receiving, by the receiving end, information on a reference amount for a hybrid automatic repeat request (HARQ) feedback from a transmitting end;
   receiving, by the receiving end, a plurality of packets from the transmitting end; and
   transmitting, by the receiving end, a feedback signal comprising HARQ feedback information for packets corresponding to the reference amount responsive to an amount of the plurality of packets reaching the reference amount, to the transmitting end.

2. The method of claim 1, further comprising:
   determining, by the receiving end, the reference amount for which the HARQ feedback information is not transmitted to the transmitting end.

3. The method of claim 1, wherein the transmitting of the feedback signal comprises:
   determining, by the receiving end, whether a first reference time passes from a reception of a last packet among the plurality of packets; and
   after the first reference time has passed, transmitting, by the receiving end, the feedback signal comprising the HARQ feedback information, to the transmitting end.

4. The method of claim 1, wherein the transmitting of the feedback signal comprises:
   transmitting, by the receiving end, the feedback signal indicating the HARQ feedback information of each of the plurality of packets, to the transmitting end.

5. The method of claim 1, further comprising:
   determining, by the receiving end, whether a second reference time passes from a reception of an initial packet among the plurality of packets; and
   when the second reference time passes from the reception of the first packet, transmitting a feedback signal comprising HARQ feedback information for packets received until the second reference time has passed.

6. The method of claim 1, further comprising:
   receiving, by the receiving end, feedback mode change information from the transmitting end; and
   confirming, by the receiving end, an operation variable for the HARQ feedback in the feedback mode change information.

7. The method of claim 6, wherein the operation variable comprises at least one of the reference amount, a first reference time, a reference time for retransmission of the transmitting end, and a feedback mode change time.

8. A method for operating a transmitting end of a wireless communication system, the method comprising:
   transmitting, by the transmitting end, information on a reference amount for a hybrid automatic repeat request (HARQ) feedback to a receiving end;
   transmitting, by the transmitting end, a plurality of packets to the receiving end; and
   receiving, by the transmitting end, a feedback signal comprising HARQ feedback information for packets corresponding to the reference amount responsive to an amount of the plurality of packets reaching the reference amount, from the receiving end.

9. The method of claim 8, wherein the transmitting of the plurality of packets comprises:
   transmitting, by the transmitting end, the plurality of packets and control information comprising a packet index of each of the plurality of packets, to the receiving end.

10. The method of claim 8, further comprising:
    changing, by the transmitting end, a feedback mode for transmitting the HARQ feedback information of the receiving end; and
    transmitting, by the transmitting end, feedback mode change information comprising an operation variable for the HARQ feedback, to the receiving end.

11. The method of claim 10, wherein the operation variable comprises at least one of the reference amount, a first reference time, a reference time for retransmission of the transmitting end, and a feedback mode change time.

12. The method of claim 10, further comprising:
determining, by the transmitting end, whether to change the feedback mode based on at least one of a service characteristic provided to the receiving end and a channel characteristic in relation to the receiving end.

13. The method of claim 8, wherein the HARQ feedback information comprises at least one of ACK indicating successful packet reception, NACK indicating packet reception failure, and discontinuous transmission (DTX) indicating no packet reception confirmed.

14. An apparatus for operating a receiving end of a wireless communication system, the apparatus comprising:
at least one processor; and
at least one transceiver configured to:
receive, by the receiving end, information on a reference amount for a hybrid automatic repeat request (HARQ) feedback from a transmitting end;
receive, by the receiving end, a plurality of packets from the transmitting end; and
transmit, by the receiving end, a feedback signal comprising HARQ feedback information for packets corresponding to the reference amount responsive to an amount of the plurality of packets reaching the reference amount, to the transmitting end.

15. The apparatus of claim 14, wherein the at least one processor is further configured to determine the reference amount for which the HARQ feedback information is not transmitted to the transmitting end.

16. The apparatus of claim 14, wherein the at least one processor is further configured to:
determine whether a first reference time passes from a reception of a last packet among the plurality of packets; and
after the first reference time has passed, transmit the feedback signal comprising the HARQ feedback information, to the transmitting end.

17. The apparatus of claim 14, wherein the at least one transceiver is further configured to transmit the feedback signal indicating the HARQ feedback information of each of the plurality of packets, to the transmitting end.

18. The apparatus of claim 14, wherein the at least one processor is further configured to:
determine whether a second reference time passes from a reception of an initial packet among the plurality of packets; and
when the second reference time passes from the reception of the first packet, transmit a feedback signal comprising HARQ feedback information for packets received until the second reference time has passed.

19. The apparatus of claim 14, wherein the at least one transceiver is further configured to:
receive feedback mode change information from the transmitting end; and
confirm an operation variable for the HARQ feedback in the feedback mode change information.

20. The apparatus of claim 19, wherein the operation variable comprises at least one of the reference amount, a first reference time, a reference time for retransmission of the transmitting end, and a feedback mode change time.

21. An apparatus for operating a transmitting end of a wireless communication system, the apparatus comprising:
at least one processor;
at least one transceiver configured to:
transmit information on a reference amount for a hybrid automatic repeat request (HARQ) feedback to a receiving end;
transmit a plurality of packets to the receiving end; and
receive a feedback signal comprising HARQ feedback information for packets corresponding to the reference amount responsive to an amount of the plurality of packets reaching the reference amount, from the receiving end.

22. The apparatus of claim 21, wherein the at least one transceiver is further configured to transmit the plurality of packets and control information comprising a packet index of each of the plurality of packets, to the receiving end.

23. The apparatus of claim 21, wherein the at least one processor is further configured to determine whether to change the feedback mode based on at least one of a service characteristic provided to the receiving end and a channel characteristic in relation to the receiving end.

24. The apparatus of claim 23, wherein the at least one processor is further configured to:
change a feedback mode for transmitting the HARQ feedback information of the receiving end; and
transmit feedback mode change information comprising an operation variable for the HARQ feedback, to the receiving end.

25. The apparatus of claim 24, wherein the operation variable comprises at least one of the reference amount, a first reference time, a reference time for retransmission of the transmitting end, and a feedback mode change time.

26. The apparatus of claim 21, wherein the HARQ feedback information comprises at least one of ACK indicating successful packet reception, NACK indicating packet reception failure, and discontinuous transmission (DTX) indicating no packet reception confirmed.

* * * * *